United States Patent Office 2,934,825
Patented May 3, 1960

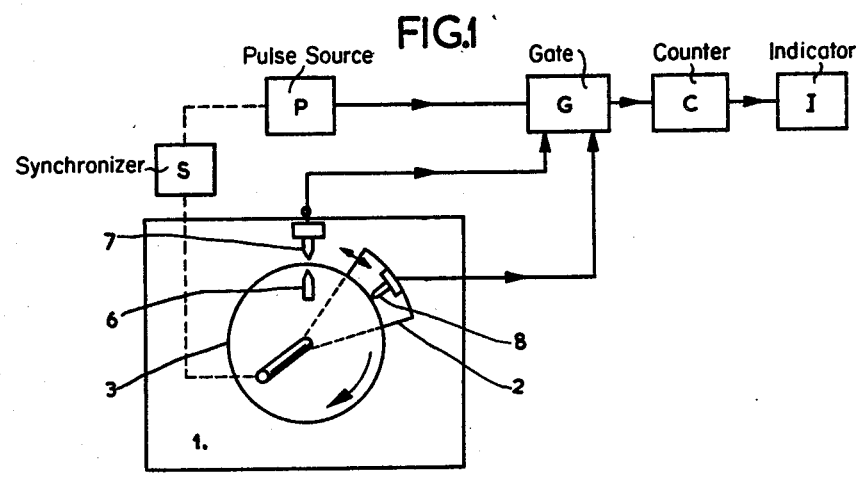
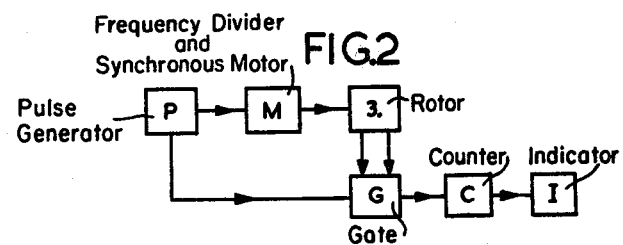
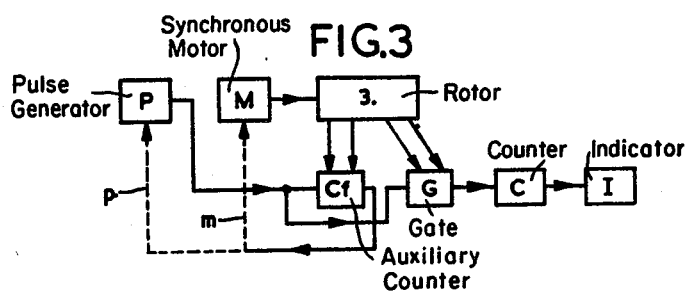

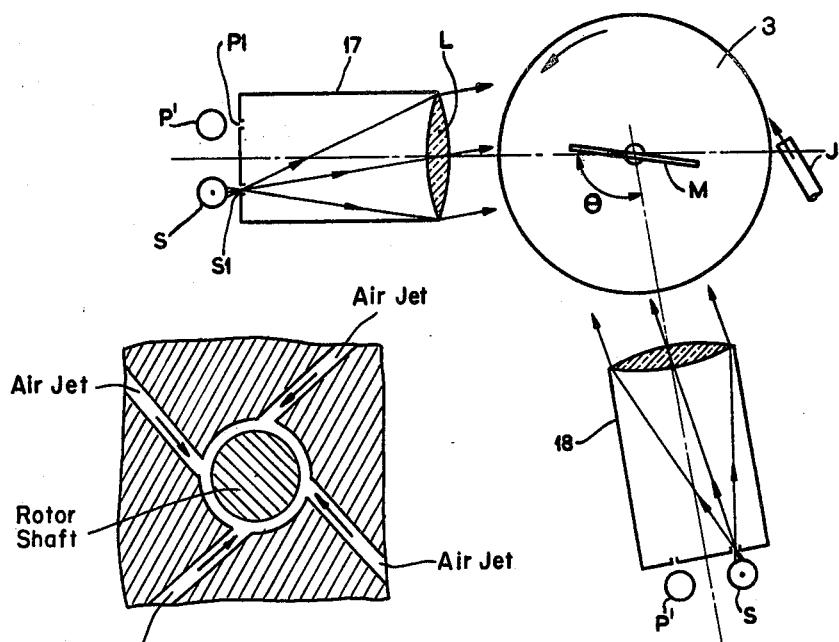
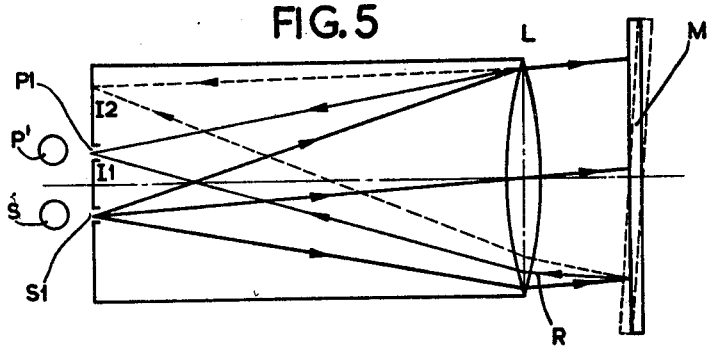

2,934,825

APPARATUS FOR MEASURING ANGLES

Clifford Herbert Braybrook, Horley, and Colin Roderick Borley, Hildonborough, England, assignors to North American Philips Company, Inc., New York, N.Y.

Application May 15, 1957, Serial No. 659,414

Claims priority, application Great Britain May 24, 1956

4 Claims. (Cl. 33—1)

The present invention relates to apparatus for measuring angles.

A requirement now exists, e.g. in the precision engineering field, for apparatus capable of measuring or being set to any angle with an accuracy of the order of ±1 second of arc, which is an accuracy greater than is currently available in the field.

Copending U.S. patent application, Serial Number 659,413 filed May 15, 1957, describes apparatus for angular measurement which includes the steps of traversing the desired angle at a substantially constant angular velocity, traversing a reference angle at substantially the same angular velocity and comparing the times required to traverse the two angles to obtain a measurement of the desired angle.

It is and object of the present invention to provide apparatus requiring less computation for angular measurement.

Apparatus for measuring angles according to the invention comprises a rotor, a marker provided on said rotor, a stationary datum marker adapted to cooperate with the rotor marker, and adjustable marker also adapted to cooperate with said rotor marker and adapted to be located in a stationary position spaced from said datum marker by an arc corresponding to the angle to be measured or determined which angle has its vertex at the axis of rotation of said rotor, a pulse generator for generating pulses, means for maintaining synchronism between the angular velocity of the rotor and the operating frequency of the generator in such manner as to maintain constant or substantially constant the ratio therebetween, electrical counting means for counting pulses generated by said generator, means for initiating and terminating a count in response to coincidences between the rotor marker and said datum and adjustable markers, and means for obtaining from said count a measurement of the desired angle.

For the purposes of the present invention the said synchronism must be maintained in the sense that the integral of the angular velocity/frequency ratio against time must be constant to within the degree of accuracy to be achieved.

With such an arrangement, a substantially fixed number of pulses is obtained for any given angle, regardless of the rotor speed or generator frequency, since the ratio therebetween is maintained constant or substantially constant. Therefore the count can be used directly as a measure of the angle traversed, with consequent simplification of the computing equipment required. Moreover, an advantage of the invention lies in the fact that neither the angular velocity of the rotor nor the repetition frequency of the pulses need be known accurately or be accurately constant provided that the desired synchronism is maintained.

The necessary synchronism may be obtained, for example, by causing the rotor speed to control the generator frequency or conversely by causing the generator to control the rotor speed.

The pulses may have any desired waveform provided that they can be counted digitally by the counting means employed, and with this proviso they may be rectified cycles or half-cycles of a sine-wave.

To simplify the synchronization problem, the rotor should have a sufficient inertia and sufficiently low damping so as virtually to eliminate irregular changes of velocity within any given revolution or measuring period. For this purpose it is desirable that the rotor be supported by compressed air bearing means so as to prevent physical contact between the rotary and stationary parts during operation.

The rotor may be driven, for example in the manner of a turbine, during measurement periods or it may be allowed to run by inertia alone during such periods. However, as will be appreciated, the said synchronism can more readily be maintained if the apparatus includes means for driving the rotor at an angular velocity constant or substantially constant at least for any period of one revolution, and employs a pulse generator which is adapted to operate at a pulse repetition frequency constant or substantially constant at least for any period of one revolution of the rotor. Such driving means may be adapted to direct an air jet at an annular peripheral surface of the rotor for driving the latter. Such rotor surface can be a plain surface without vanes or blades since sufficient torque can thus be obtained together with extreme smoothness and constancy of torque.

The terms "marker" and "cooperating markers" are used herein in a broad sense to denote any means capable of acting rapidly and accurately on a cooperating device to indicate an instant of coincidence therewith, i.e. an instant in which one marker passes another at a predetermined relative position. For example, a rotary marker may be constituted by a sharply localized magnet and a cooperating stationary marker may be provided in the form of a magnetic pick-up head, or alternatively the marker system may be of an electro-optical nature. However, in a predetermined arrangement, a rotary marker constituted by a plane reflecting surface on the rotor cooperates with two stationary markers each constituted by an auto-collimator. Auto-collimators are available with very high angular resolutions, e.g. of about 0.2 second of arc, and can readily be associated with photoelectric means for controlling the counting means. An advantage of this arrangement lies in the fact that the angular measurements do not depend on the distance between the reflecting marker and the (or each) cooperating auto-collimator markers; other advantages will be explained below.

In order that the invention may be readily carried into effect, it will now be described with reference to the accompanying drawing, wherein:

Fig. 1 is a schematic diagram of an embodiment of the apparatus of the present invention;

Fig. 2 is a schematic block diagram of an embodiment of a synchronizing system for the apparatus of the present invention;

Fig. 3 is a schematic block diagram of a modification of the embodiment of Fig. 2;

Fig. 4 is a schematic diagram of an embodiment of a marking arrangement which may be utilized with the apparatus of Fig. 1;

Fig. 5 is a schematic diagram of a portion of the embodiment of Fig. 4 to aid in explaining the operation of such portion; and Fig. 6 is a schematic diagram of an embodiment of compressed air bearing means.

Referring to Fig. 1, the apparatus comprises three main members, a base 1, a rotatable table 2 and a rotor 3 which is coaxial with the rotatable table. In operation, the rotor 3 turns at a substantially constant angular velocity and when a marker 6 on the rotor passes a marker 7 on the base a gate G is opened which allows pulses from a pulse source P to be fed into a counter C. When the same rotor marker passes an adjustable marker 8 on the rotatable table the counter C is gated off.

One revolution contains approximately $1.3 \times 10^6$ seconds so that if the pulse repetition frequency and counting rate is of the order of 1 megacycle per second then the angular velocity of the rotor must be about one revolution per second.

The synchronizing means are shown schematically as a unit S connected between the shaft of the rotor 3 and the pulse generator P.

The count obtained at each revolution is directly proportional to the angle between markers 7 and 8. The computed angular quantity may be displayed by indicating means I and such quantity may be used for control purposes, e.g. in a servo system.

Ancillary driving means may be provided for starting the rotor and accelerating it up to a speed approximately equal to the desired operating speed, after which the drive function passes to the synchronous system.

Synchronism may be effected in various ways. Two general methods are shown in the block schematic diagrams of Figs. 2 and 3, respectively.

In Fig. 2, the pulse generator P controls the speed of a synchronous motor or other synchronous drive means M which may include a frequency divider. Means M in turn drives or is rigid with the rotor 3. The counter C is gated by the action of rotor 3, as described with reference to Fig. 1, and provides an indication of angle in unit I. This system provides sufficiently accurate control of the rotor speed by the pulse generator.

In the system of Fig. 3, a closed feedback loop is provided for maintaining synchronism, and the control action of such loop may be of an analogue nature. A motor or other drive means M causes rotation of the rotor 3 and the latter causes gating of counter C which, as in Figs. 1 and 2, receives pulses from generator P and provides an indication in unit I. In addition, the pulses from generator P are supplied to an auxiliary counter Cf which is also gated by the action of rotor 3 over a fixed reference angle. The count obtained during any operating cycle by counter Cf is used as information concerning the angular velocity of the rotor in relation to the pulse frequency and this information is converted into an appropriate error signal which may be fed back to the drive means M for correcting the rotor speed (as indicated by the connection m) or to the generator P (by a connection p) so as to correct the pulse repetition frequency. In either event, the correction tends to restore the ratio between angular velocity and pulse frequency to the desired value.

Gating of the auxiliary counter Cf may be effected by a completely separate set of markers. Alternatively, some or all of the markers controlling the main counter C may be given the additional function of gating counter Cf. For example, if the reference angle is 180°, a marker arrangement such as that of Fig. 1 may be used with an additional fixed marker (for counter Cf) placed at 180° in relation to marker 7. The choice of 180° is convenient inasmuch as one half of each revolution can be used for resetting purposes so that a measurement can be made during each revolution.

In Fig. 3, the drive means are represented at M in a purely schematic manner and may in practice for example be an air jet acting on the periphery of the rotor.

Fig. 4 is a schematic plan view of an arrangement employing a rotor 3 in the form of a disc or wheel carrying a single marker constituted by a plane mirror M. The stationary auto-collimator markers 17, 18 are arranged to cooperate with different portions of the mirror M (said markers are located at different heights in order to prevent the beam from one auto-collimator from affecting the other).

The operation of each auto-collimator will be explained with reference to Fig. 5. Basically, an auto-collimator is a wide-aperture lens camera focussed for infinity. The rear wall has a slit S1 illuminated from behind by a light source S and a slit P1 having a receiving photocell P' at its rear. Light from source S is formed into a parallel beam after passing through a lens L and can only have its direction changed by a plane mirror M. If mirror M were precisely normal to the parallel beam, the light would retrace its path, coming to a focus again at S1. In Fig. 5, the mirror is shown in two positions, one with the focussed image of the slit S1 on the cell slit (position I1), and one with said image at I2. As mirror M rotates, the slit image traverses the rear wall of the camera and a pulse is obtained from the photocell as the image crosses slit P1. Therefore, the distance of the mirror M from the auto-collimator does not affect the operation of the device for angular measurement and the device is thus only sensitive to direction. Furthermore, the device is not sensitive to displacement of the mirror in the direction of its plane (as could arise due to play in the bearing of the rotor) so long as the mirror is large enough to receive the beam despite such displacement. Thus, although the operative axes of the auto-collimator have been shown (in Fig. 4) intersecting on the axis of rotation, this is not a necessary condition. As a further consequence, the axis of the rotor need not be accurately coaxial with the axis about which the movable auto-collimator is adjusted. Moreover, although the plane of the reflecting surface of mirror M is shown in Fig. 4 so located as to contain the axis of rotation, the mirror surface may be displaced from said axis and/or tilted in relation thereto by an angle of a few degrees. Such a tilt will not materially affect the accuracy of measurement provided that each auto-collimator is appropriately aligned.

In Fig. 4 an air jet J is shown directed at a plain annular surface of the rotor 3 for driving said rotor and the said rotor is supported entirely by compressed air bearing means. Fig. 6 shows an embodiment of compressed air bearing means.

While the invention has been described by means of specific examples and in specific embodiments, we do not wish to be limited thereto, for obvious modifications will occur to those skilled in the art without departing from the spirit and scope of the invention.

What is claimed is:

1. Apparatus for measuring angles comprising a rotor, a marker on said rotor comprising a plane mirror, a stationary marker adapted to cooperate with the rotor marker, said stationary marker comprising an auto-collimator adapted to cooperate with said mirror, an adjustable marker also adapted to cooperate with said rotor marker and adapted to be located in a stationary position spaced from said stationary marker by an arc corresponding to the angle to be measured, which angle has its vertex at the axis of rotation of said rotor, means for causing rotation of said rotor at an angular velocity substantially constant at least for any period of one revolution, a pulse generator for generating pulses, means for maintaining synchronism between the angular velocity of the rotor and the operating frequency of said pulse generator in such manner as to maintain substantially constant the ratio therebetween, electrical counting means for counting pulses generated by said pulse generator, means for initiating and terminating a count in response to coincidences between the rotor marker and said stationary and adjustable markers, and means for obtaining from said count a measurement of the desired angle.

2. Apparatus for measuring angles comprising a rotor, a marker provided on said rotor, a stationary marker adapted to cooperate with the rotor marker, an adjustable marker also adapted to cooperate with said rotor marker and adapted to be located in a stationary position spaced from said stationary marker by an arc corresponding to the angle to be measured which angle has its vertex at the axis of rotation of said rotor, means for causing rotation of said rotor at an angular velocity substantially constant at least for any period of one revolution, said rotation causing means comprising means for directing an air jet at an annular peripheral surface of said rotor, a pulse generator for generating pulses having a substantially high repetition frequency, said pulse generator being separate from said rotor, electrical counting means for counting pulses generated by said pulse generator, means controlled by said rotor supplying an electrical signal to said pulse generator for maintaining synchronism between the angular velocity of the rotor and the operating frequency of said pulse generator in such manner as to maintain substantially constant the ratio therebetween, means for initiating and terminating a count in response to coincidences between the rotor marker and said stationary and adjustable markers, and means for obtaining from said count a measurement of the desired angle.

3. Apparatus for measuring angles comprising a rotor, a marker provided on said rotor, a stationary marker adapted to cooperate with the rotor marker, an adjustable marker also adapted to cooperate with said rotor marker and adapted to be located in a stationary position spaced from said stationary marker by an arc corresponding to the angle to be measured which angle has its vertex at the axis of rotation of said rotor, compressed air bearing means supporting said rotor, means for causing rotation of said rotor at an angular velocity substantially constant at least for any period of one revolution, a pulse generator for generating pulses having a substantially high repetition frequency, said pulse generator being separate from said rotor, electrical counting means for counting pulses generated by said pulse generator, means controlled by said rotor supplying an electrical signal to said pulse generator for maintaining synchronism between the angular velocity of the rotor and the operating frequency of said pulse generator in such manner as to maintain substantially constant the ratio therebetween, means for initiating and terminating a count in response to coincidences between the rotor marker and said stationary and adjustable markers, and means for obtaining from said count a measurement of the desired angle.

4. Apparatus for measuring angles comprising a rotor, a marker on said rotor comprising a plane mirror, a stationary marker adapted to cooperate with the rotor marker, said stationary marker comprising an auto-collimator adapted to cooperate with said mirror, an adjustable marker also adapted to cooperate with said rotor marker and adapted to be located in a stationary position spaced from said stationary marker by an arc corresponding to the angle to be measured which angle has its vertex at the axis of rotation of said rotor, compressed air bearing means supporting said rotor, means for causing rotation of said rotor at an angular velocity substantially constant at least for any period of one revolution, said rotation causing means comprising means for directing an air jet at an annular peripheral surface of said rotor, a pulse generator for generating pulses, means for maintaining synchronism between the angular velocity of the rotor and the operating frequency of said pulse generator in such manner as to maintain substantially constant the ratio therebetween, electrical counting means for counting pulses generated by said pulse generator, means for initiating and terminating a count in response to coincidences between the rotor marker and said stationary and adjustable markers, and means for obtaining from said count a measurement of the desired angle.

References Cited in the file of this patent

UNITED STATES PATENTS

| | | |
|---|---|---|
| 2,046,005 | Sprecker | June 30, 1936 |
| 2,249,373 | Alkan | July 15, 1941 |
| 2,433,385 | Miller | Dec. 30, 1947 |
| 2,599,378 | Fleischmann | June 3, 1952 |
| 2,688,805 | Annen | Sept. 14, 1954 |
| 2,730,698 | Daniels | Jan. 10, 1956 |
| 2,734,188 | Jacobs | Feb. 7, 1956 |